April 14, 1931.  J. MAJOR  1,801,017
POWER DRIVEN HOE
Filed May 7, 1929
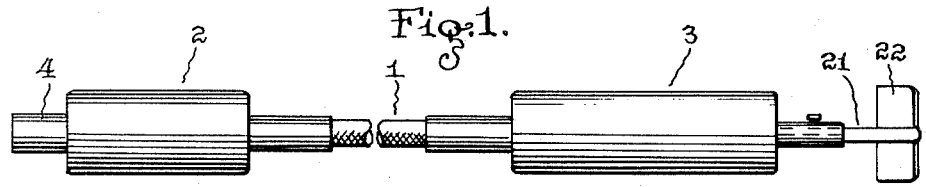
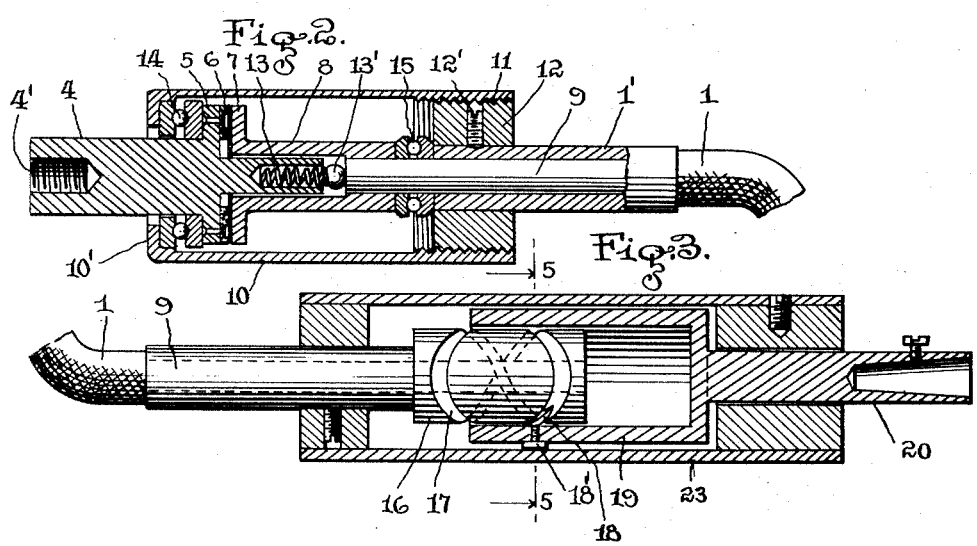
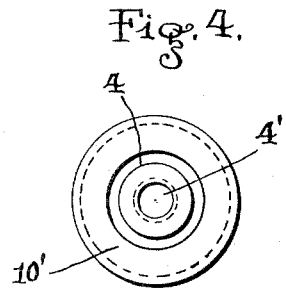
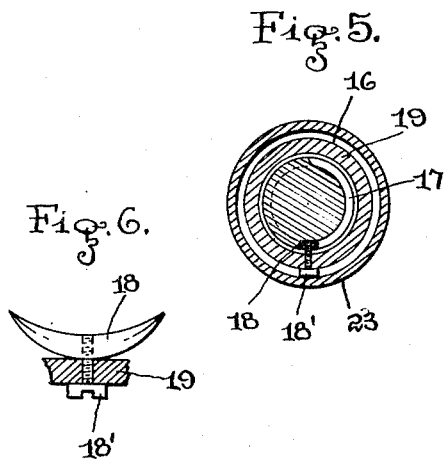

Patented Apr. 14, 1931

1,801,017

UNITED STATES PATENT OFFICE

JOSEPH MAJOR, OF PATERSON, NEW JERSEY

POWER-DRIVEN HOE

Application filed May 7, 1929. Serial No. 361,244.

My invention relates to improvements in power-driven hoes, and the object of my invention is to provide a hoe operated by power.

I accomplish this object by the device illustrated in the accompanying drawings in which—

Figure 1 is a view of the device assembled,
Figure 2 is a sectional view of the clutch,
Figure 3 is a sectional view of the reciprocating drive,
Figure 4 is an end view of Figure 2,
Figure 5 is a section on the line 5—5 in Figure 3, and
Figure 6 is a view of the guide.

Similar characters of reference refer to similar parts throughout the several views.

My improved device includes a flexible drive shaft 1, a clutch 2, and a head 3.

Any desired form of clutch may be used. I preferably employ, however, the form of clutch hereinafter described, which includes a coupling head 4, having threads 4' for engagement with the rotatable drive shaft of an engine motor or the like, and is provided with a collar 5, carrying a friction pad 6, adapted to frictionally engage the face 7, of the cylindrical head 8 which is secured to the rotatable core 9, of the flexible drive shaft 1. The cylindrical shell 10, of the clutch 2 is provided at one end with an inwardly projecting flange 10', and at the other end with internal threads 11, engaging threads on the block 12, whereby the shell 10 may be drawn up by rotation on the block 12.

The block 12 may be fixed by a set screw 12' on the casing 1' of the flexible shaft 1. A compression spring 13, serves to normally spread the friction pad 6, from the face 7 of the head 8.

When it is desired to rotatably drive the core 9, of the shaft 1, the shell 10, is manually rotated and thus drawn up by the threads 11, against the tension of the spring 13, whereby the friction pad 6, will frictionally engage the face 7 of the head 8. The head 4, and the core 9 of the flexible shaft 1, being thus brought into operative engagement, the shaft 1 will rotate with the coupling head 4. The reverse rotation of the shell 10 of the coupling will relieve the tension on the spring 13, which will then press the friction pad 6, away from the face 7 of the head 8, and break the frictional engagement.

I provide an anti-friction bearing 13' between the spring 13, and the end of the core 9, and I also provide anti-friction bearings 14, 15 respectively to reduce the friction between the rotating parts.

The rotatable core 9 of the flexible shaft 1, is provided at its free end with a cylindrical block 16, having a spiral groove 17, in its face, in which a stud 18 is seated. The stud 18, is secured by a screw 18' in the hollow cylindrical reciprocating head 19, on which is the bit 20, adapted to carry the shank 21, of a hoe, 22. I preferably provide a casing 23, for the said parts. The stud 18 is in the form of a crescent rounded and shaped to conform to the configuration of the inner face of the spiral groove 17 in which it rides, whereby the tendency of the parts to bind is minimized and the comparatively large surface thus presented by the stud serves as a guide and avoids the shearing off of the stud. It is desirable to attain in hoes a comparatively long stroke without abrupt change of motion and I attain this by my novel spiral groove 17 which is in the form of a figure 8, the extremities of the loops thereof being as widely spaced as the block will permit.

The device being thus assembled the rotation of the flexible shaft 1, may be controlled by the clutch 2. The rotation by the core 9 of the shaft 1 will, through the reciprocating action, of the head 19, cause the hoe to operate as desired.

Having thus described my invention, what I claim is:

1. In a power driven hoe, the combination of a hoe, a rotatable shaft secured thereto, a hollow cylindrical head on said shaft, a crescent shaped stud in said head, a block, a cam slot in said block in the form of a figure 8 and adapted to engage said stud and means to rotate said block whereby a reciprocating motion will be imparted to the hoe.

2. In a device of the character described, the combination of a rotatable drive shaft and a non-rotatable drive shaft, a connection therebetween adapted to convert the rotary motion of the rotatable drive shaft into reciprocatory motion in the non-rotatable drive shaft, and comprising a casing, a hollow head therein, a block slidable in said head, a groove on said block in the form of a figure 8 having widely spaced loops, a stud carried by said reciprocating head and resting in said groove, said stud being in the form of a rounded crescent, whereby the rotation of said block will cause the groove to travel on the stud and to impart reciprocatory motion to the non-rotatable shaft, and means for imparting power to the rotatable shaft.

In testimony whereof I affix my signature.

JOSEPH MAJOR.